Figure 1:
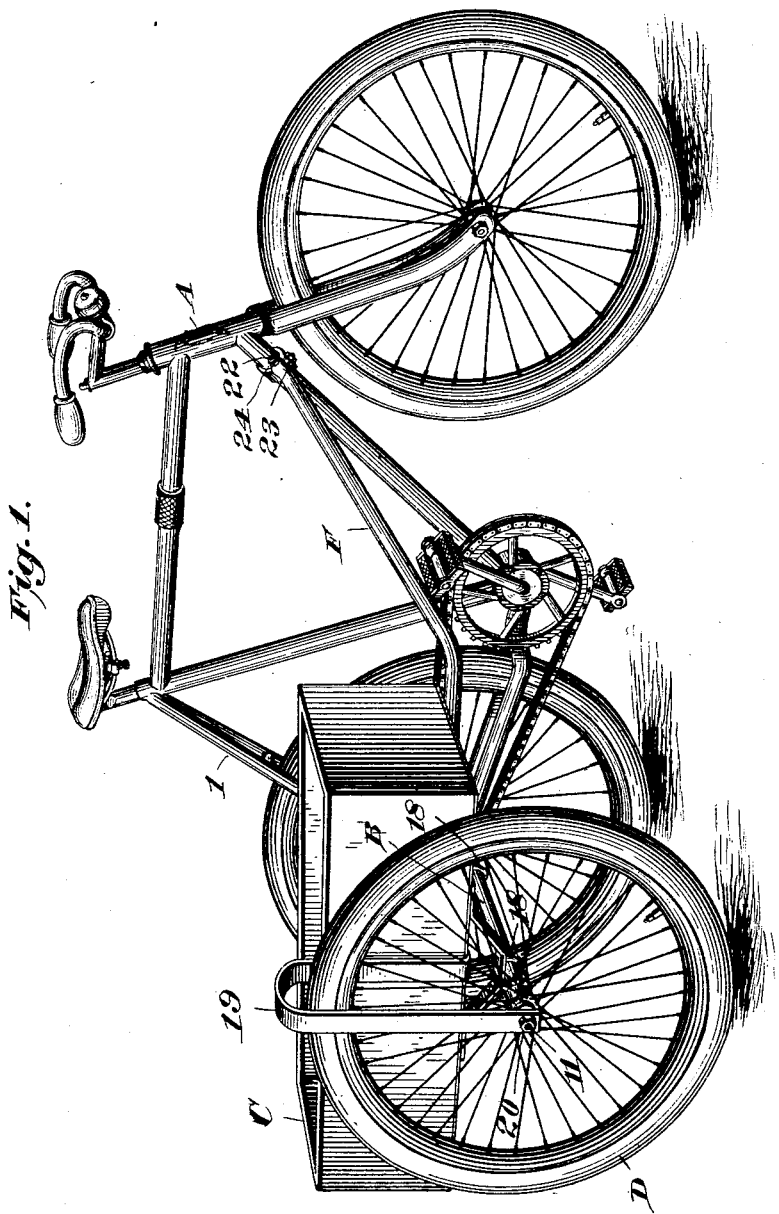

No. 702,829. Patented June 17, 1902.
C. R. SMITH.
BICYCLE WHEEL CARRIER.
(Application filed Nov. 1, 1901.)
(No Model.) 2 Sheets—Sheet 1.

Witnesses
Elmer Leavey
Watts T. Estabrook

Inventor
Claude R. Smith
By Rhesa G. DuBois
His Attorneys

No. 702,829. Patented June 17, 1902.
C. R. SMITH.
BICYCLE WHEEL CARRIER.
(Application filed Nov. 1, 1901.)
(No Model.) 2 Sheets—Sheet 2.
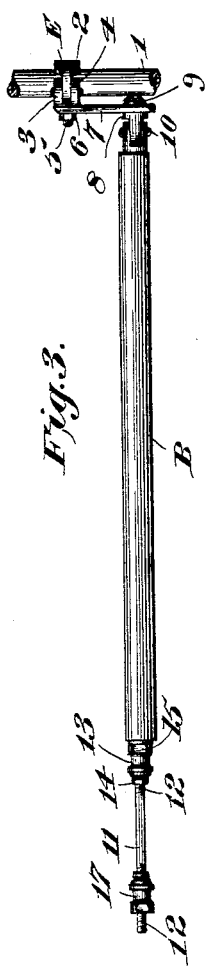
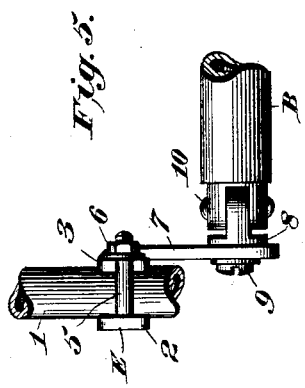
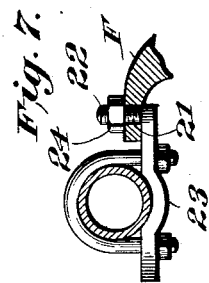
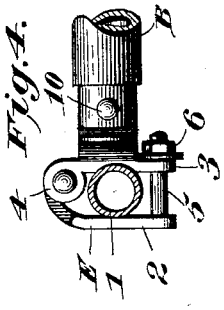
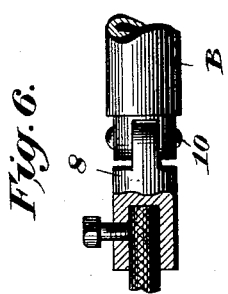
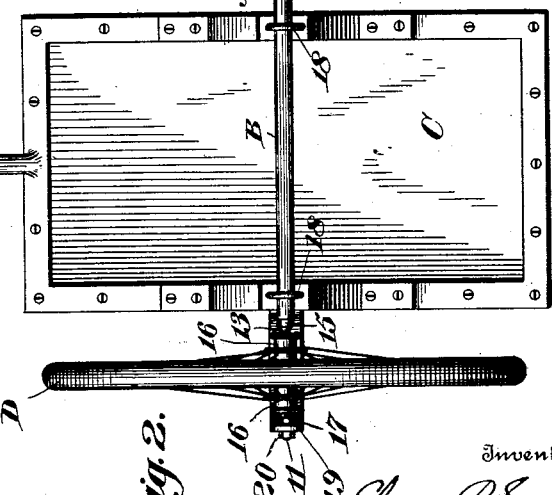
Witnesses
Elmer Seavey
Watts T. Estabrook
Inventor
Claude R. Smith
By Rhea & D. Baish
Attorneys

UNITED STATES PATENT OFFICE.

CLAUDE R. SMITH, OF OLEAN, NEW YORK, ASSIGNOR OF ONE-HALF TO HARRY J. GIBNEY, OF OLEAN, NEW YORK.

BICYCLE-WHEEL CARRIER.

SPECIFICATION forming part of Letters Patent No. 702,829, dated June 17, 1902.

Application filed November 1, 1901. Serial No. 80,796. (No model.)

*To all whom it may concern:*

Be it known that I, CLAUDE R. SMITH, a citizen of the United States of America, residing at Olean, in the county of Cattaraugus and State of New York, have invented certain new and useful Improvements in Bicycle-Wheel Carriers, of which the following is a specification.

My invention relates to an improvement in bicycle-carriers; and the object is to provide an attachment for converting an ordinary "safety-bicycle" into a delivery-carrier and in so doing to overcome the difficulty hitherto encountered in this class of vehicles in turning curves or corners, a primary feature of my present invention being the provision of a joint between the bicycle proper and the carrier attachment which will permit the bicycle to tip inwardly and outwardly in turning a curve the same with the carrier attachment as if the latter were not present and to allow the bicycle portion to again right itself when on a straight course or standing still.

With the foregoing object in view my invention consists in an attachment for bicycles connected to the latter by means of a hinged joint, whereby the bicycle has the same freedom of lateral or tipping movement as if the attachment were not present; and the invention further consists in certain novel features of construction and combinations of parts, which will be hereinafter described, and pointed out in the claims.

In the accompanying drawings, Figure 1 is a view in perspective. Fig. 2 is a bottom plan view. Fig. 3 is a detached view of the axle attachment, and Figs. 4, 5, 6, and 7 are detail views of my improved device.

A represents an ordinary bicycle, and B is an axle adapted for attachment thereto to afford support for the delivery-box C and to furnish a bearing for the outer wheel D.

E indicates a clamp for attaching the axle B to the right-hand member of the rear fork 1 of the bicycle-frame. The clamp might be variously constructed, and, as shown, consists of a pair of jaws 2 and 3, hinged together, as at 4, and a bolt 5, connected with the opposite ends of the jaws and having a nut 6, whereby to secure the jaws tightly upon the tubing of the bicycle-frame. Projecting forwardly from one of the jaws of the clamp is an arm 7, and to the outer end of this arm a knuckle 8 is swiveled, as at 9, and to this knuckle the axle B is hinged by means of the pin or rivet 10 passing through the end of the axle and the knuckle. Other methods of forming a hinged joint might be employed; but the one described is simple and effective. At the opposite end of the supplemental axle B a bearing-spindle 11 is secured in some convenient way. This bearing-spindle is screw-threaded at each end, as at 12 12, one end being screwed into the end of the supplemental axle B, and a combined lock-nut and cone 13, screwed onto the inner end or thread, holds the spindle rigidly attached to the axle. At one end of this nut the cone 14 is formed to constitute a ball-race, and at some other point thereon there is an angular formation 15 to receive a wrench, by which it is turned on or off. The wheel D is placed upon this spindle, ball-bearings 16 16 being interposed between the inner end of the wheel-hub and the cone 14, and the wheel is retained on the axle by means of another cone 17 at the outer end.

The box C is secured on the supplemental axle by means of staples or similar means 18 18, and a combined guard and support 19 extends from beneath and alongside the outer edge of the box over and around the outer wheel D and is held on the outer end of the spindle by means of a nut 20.

A tongue F, secured to the forward end of the box C, preferably at or near its center, extends forward and affords a front support for the box, its forward end bending upwardly and laterally toward the bicycle-frame, to which it has a hinged connection through an eye 21 with the bearing-stud 22 on the clip 23, which latter is clamped to the frame of the bicycle, a nut or similar device 24 holding the tongue on the bearing-stud.

From the foregoing it will be understood that the entire attachment can be quickly applied to any bicycle of the safety type without the slightest difficulty, and when applied the bicycle can be ridden with as much ease in turning corners as if the attachment were not present. By means of the swiveled hinged connection the supplemental axle not only adjusts itself to the position on the frame of the bicycle where it is attached, but also renders it possible to clamp the inner end of the supplemental axle to a member of the lower fork as well as to a member of the upper fork, although the latter will be for most purposes preferable. The outer wheel is also applied with equal facility, and when the attachment is in position as heretofore stated there is nothing to interfere with the freedom of movement of the bicycle either in turning a curve or in righting itself on a straight course, thus obviating objections heretofore present in this class of combination-vehicles.

As a slight modification of the method of clamping the supplemental axle to the bicycle-frame the knuckle might have a hole bored in it large enough to receive the ordinary bicycle-step therein, as shown in Fig. 6, and the knuckle would then be secured to the step by means of a set-screw extending through the knuckle and against the step. In other respects the construction would be the same.

It is evident that other slight changes might be resorted to in the form and arrangement of the several parts described without departing from the spirit and scope of my invention, and hence I do not wish to limit myself to the exact construction herein set forth; but,

Having thus fully described my invention, what I claim as new, and desire to secure by Letters Patent, is—

1. The combination with a bicycle, of a supplemental axle rotatably hinged thereto at one end, a spindle adapted to be detachably secured in the free end of the supplemental axle, a combined lock-nut and cone for retaining the spindle in position in the auxiliary axle, a wheel mounted on the free end of the axle, a delivery-box attached to the axle, a tongue secured at one end to the box, the opposite end of the tongue having hinged connection with the bicycle.

2. The combination with a bicycle of an auxiliary axle, a knuckle formed on one end thereof, a hinged clamp pivotally secured to the knuckle, means for detachably securing the clamp to any convenient portion of the bicycle, a spindle detachably received in the free end of the axle, a combined lock-nut and cone for retaining the spindle in position, a wheel mounted on the spindle, a delivery-box attached to the axle, a tongue secured to the delivery-box, the opposite end of the tongue hinged to the bicycle.

3. The combination with a bicycle, provided with a lateral projection, of an auxiliary axle, a knuckle connected to one end of the axle, a socket connected to the knuckle, the lateral projection receivable within the socket, means for removably retaining the projection in the socket, a wheel mounted on the free end of the axle, a delivery-box attached to the axle, a tongue connected to the box, the opposite end of the tongue having hinged connection with the bicycle.

4. The combination with a bicycle, of a supplemental axle, means for connecting one end of the axle to the frame of the bicycle, the axle provided with spindle detachably connected to its free end, a combined lock-nut and cone for retaining the spindle in position, a wheel detachably mounted on the spindle, a delivery-box mounted on the axle, a tongue secured to the delivery-box, the free end of the tongue detachably hinged to the frame of the bicycle.

5. The combination with a bicycle, of a supplemental axle, a knuckle pivotally secured to one end of the axle, an arm to which the knuckle is swiveled, a pair of hinged jaws to which the arm is secured at its opposite end, and means for detachably securing the jaws to the frame of the bicycle.

In testimony whereof I have signed my name to this specification in the presence of two subscribing witnesses.

CLAUDE R. SMITH.

Witnesses:
JASON E. STONE,
PAUL KROLINGER.